INVENTORS.
ALBERT J. WILLIAMS, JR.
BY RICHARD E. WATSON

ATTORNEYS

INVENTORS.
ALBERT J. WILLIAMS, JR.
RICHARD E. WATSON
BY
Woodcock and Phelan
ATTORNEYS Patented Jan. 12, 1954

2,666,171

UNITED STATES PATENT OFFICE 2,666,171

ELECTRIC MOTOR CONTROL SYSTEM WITH REDUCED CROSS-DEPENDENCE OF CONTROL EFFECTS

Albert J. Williams, Jr., Philadelphia, and Richard E. Watson, Chesney Downs, Pa., assignors to Leeds and Northrup Company, Philadelphia, Pa., a corporation of Pennsylvania Application August 28, 1951, Serial No. 244,002

17 Claims. (Cl. 318—28)

This invention relates to control systems of the type used for the regulation of the magnitude of a controlled or measured variable, quantity or condition, such as temperature, pH values, rate of flow, or other physical, chemical or electrical condition, and has for an object the provision of a method of and means for reducing cross-dependence between the adjustment of a reset control element and the rate control effect and between the adjustment of a rate control element and the reset control effect so that the magnitudes of the control effects may be independently varied between wide limits.

The present invention relates particularly to electrical systems of the type disclosed in Callender et al. Reissue Patent Number 23,366, and to electrical systems of the type disclosed in application for Letters Patent Serial Number 149,775, filed March 15, 1950, by Elwood T. Davis, a co-employee. In said patent and in said application there are disclosed control systems which provide proportional, reset, and rate control actions, but such systems leave much to be desired in reducing the cross-dependence between the adjustment of the reset control element and the rate control effect and between the adjustment of the rate control element and the reset control effect. In accordance with the present invention the rate control effect or the reset control effect or both may be varied within relatively wide limits without greatly affecting the proportional control action.

In accordance with systems of the type under discussion, the aim is to maintain the magnitude of the controlled variable at a predetermined value, generally referred to as the control point, by the positioning of a final control element, which regulates the magnitude of the controlled variable in accordance with the sum of several different components which we will call control actions. One such component of the total control action is known as proportional control action which means that one component of the position of the final control element, which may be a valve or a rheostat or the like, is made to have a predetermined ratio with respect to the deviation of the controlled variable from the control point. Another component of control action is automatic reset. Automatic reset, or droop correction, means that for a sustained deviation of the controlled variable from the control point the position of the final control element will have a component which depends upon the time integral of the deviation of the controlled variable from the control point. A third component is referred to as rate action which means that the position of the final control element will also have a component which depends upon the rate of change of the controlled variable. While other actions may be included, some of which will be later described in detail, for purposes of the present introductory discussion those mentioned are the principal ones which are ordinarily found in control systems.

In the present specification, the term "control action" is used to indicate that portion of the movement of the final control element due to each of the various control actions in response to changes of the condition under control from the desired control point of the process. However, as will be apparent to those familiar with control systems, this definition does not include terms which are normally used in evaluating a control system quantitatively. For this reason, the term "control effects" will be utilized herein to designate the reset control effect and rate control effect. The reset control effect is defined as the reset action constant divided by the proportional action constant. The rate control effect is defined as the rate action constant divided by the proportional action constant.

The reset control effect has been referred to in the prior art as reset response or reset rate and may be expressed as repeats per unit of time, the latter term being derived from the performance of a controller when a "step" change is imposed upon its input by an abrupt change in the controlled characteristic. With such a change the final control element takes an immediate step in response to the proportional action of the controller and then moves at a uniform rate in response to the reset action of the controller. The motion of the final control element in one minute resulting from the reset action divided by the motion of the final control element resulting from the proportional action gives the repeats per minute.

The rate control effect has been referred to in the prior art as rate response or rate time, the latter term being derived from the performance of a controller when a "ramp" change is imposed upon its input, such as by a uniform rate of increase in the controlled characteristic. With such a change the final control element takes an immediate step in response to the rate action of the controller and then moves at a uniform rate in response to the proportional action of the controller. The time advance of the final control element by virtue of the amount of rate action in the presence of proportional action is the rate time.

Where control actions are introduced by electrical circuits including combinations of resistance and reactance, it has been found that when the resistance or the reactance affecting the magnitude of one control effect is changed, there may be concurrently a substantial change made in the magnitude of another of the control effects. Such dependence of one control effect upon an adjustment intended to make a change in another control effect is in many cases quite undesirable since the difficulty in bringing the control system as a whole into adjustment to meet the demands of a particular process becomes exceedingly difficult. On the other hand, when there is reduced dependence of the proportional control action upon adjustment of a rate control element, and upon adjustment of a reset control element, opportunity is afforded to judge the effect of each adjustment on the process as a whole and thus to make further needed adjustments which in a minimum of time will bring the control system into operation meeting the needs of the particular process.

The present invention is particularly applicable to the electrical systems of the type already mentioned and of the type disclosed in said copending application and said Callender patent, though it is to be understood that the principles may be extended to other electrical systems once understood.

In carrying out the present invention in one form thereof, the control effects produce a movement of the final control element resulting from deviation of the controlled variable from the control point and the previous deviations from said control point. A potential difference which varies with deviation in the controlled variable from the control point is applied as one part of the input signal to a high impedance amplifier. The foregoing potential difference is opposed by a second potential difference produced by a network which is effectively terminated in a resistor across which the potential difference appears; this being the other part of the input signal to the amplifier. In certain control systems it is desirable to terminate this latter portion in a resistor, such as where the potential difference in the first portion of the amplifier is produced by a thermocouple. In these types of control systems we have discovered that it is possible to reduce the cross-dependence of the control effects. The circuit arrangement is preferably characterized by the fact that the rate capacitor is in electrical effect connected in parallel with the resistive termination and this section is in series with a section of the network leading to a variable source of voltage, the magnitude of which is changed with adjustment of the final control element, this latter section of the network including a reset reactance and an adjustable rate-regulating resistance. We have found that the cross-dependence of the control effects may be reduced if there be eliminated any impedance between that section of the electrical control circuit including the reset reactance and the parallel section which terminates the network. The foregoing applies even though additional voltage dividers and additional resistive branches be added to the circuit in parallel with the section including said resistive termination providing that the section including the reset reactance be connected in series with the voltage source which is adjustable with the final control element. The latter section may include a rate adjusting resistor effectively in series with the reset reactance.

For further objects and advantages of the invention, reference is to be had to the following description taken in conjunction with the accompanying drawings in which.

In explaining in more detail the nature of our discovery and the manner in which it has been applied to the accomplishment of new results, it is believed that there should first be presented an analysis of the several control actions involved followed by a brief description of the system as a whole. Accordingly, reference will first be made to Fig. 1 which is a simplified elementary diagram which though entirely accurate insofar as the following description is concerned, may not exactly conform in all details with an electrical system actually used in practice.

Figure 1:
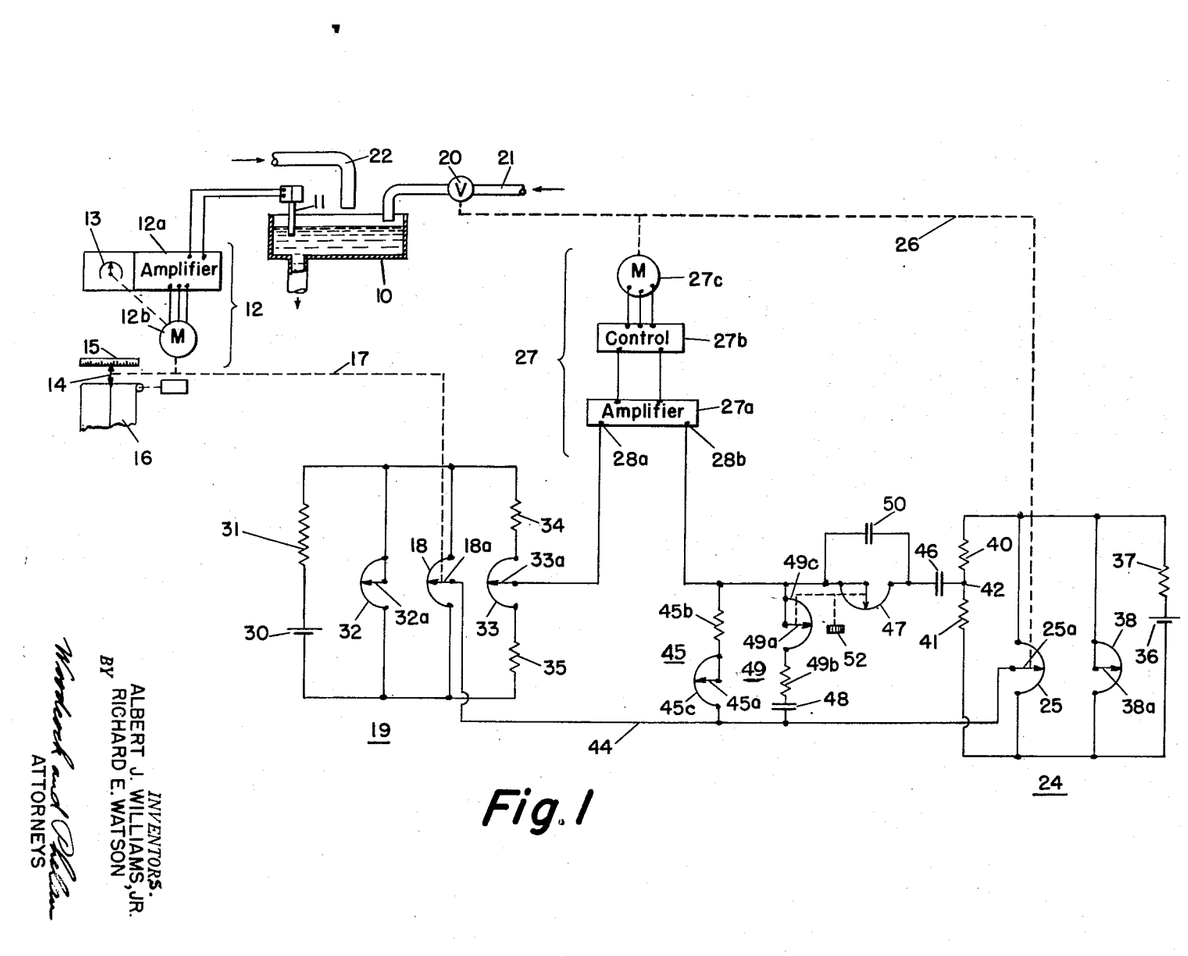
Fig. 1 diagrammatically illustrates the present invention as applied to the control of a chemical condition.

In Fig. 1, the invention has been illustrated as applied to the control of a variable characteristic which, of course, may be the temperature of a furnace or other desired characteristic, such, for example, as the pH of a solution in a vessel or flow channel 10. The pH or other characteristic of the solution in channel 10 may be potentiometrically detected as by pH responsive electrodes 11, the output of which is applied to an electro-mechanical amplifier 12. The amplifier 12 is to be taken as representative of any suitable measuring system and preferably of the type disclosed in Williams Patent 2,367,746, dated January 23, 1945. Upon change of the pH or ion concentration of the solution in vessel 10, a motor 12b under the control of amplifier 12a is energized to adjust a rebalancing slidewire 13 and concurrently to move a pen-indicator 14 relative to a scale 15 and a chart 16 to indicate and record a change in the ion concentration. Through a suitable mechanical connection indicated by the broken line 17, relative adjustment between a slidewire 18 and its contact 18a is produced to unbalance a balanceable electrical network 19.

It will be observed that a valve 20 in a reagent supply line 21 controls the ingress of the reagent to the vessel 10, the reagent being selected to maintain a desired ion concentration in the solution of vessel 10. The purpose of the control system is to maintain the ion concentration of the solution at a predetermined value notwithstanding wide changes or small changes as may be produced by variations in characteristics of another solution introduced into channel 10 as by way of a further supply line 22.

The control system proper, including the balanceable network 19, also includes a second potentiometric network 24 in which relative adjustment between a slidewire 25 thereof and a movable cooperating contact 25a is produced by way of a mechanical connection 26 extending from a motor 27c which also serves to adjust the valve 20 in response to operation of an electro-mechanical amplifier, designated generally as 27. Electro-mechanical amplifier 27 includes, in addition to motor 27c, a high impedance amplifier 27a and a suitable motor "control" 27b. The latter has been indicated in block diagram form to suggest that relays may be utilized for energization of the motor 27c, the relays themselves being under control of the amplifier 27a in lieu of direct energization from amplifier 27a as in the case of the motor 12b which is controlled by amplifier 12a. In the further description, the respective contacts associated with slidewires or resistors will be described as adjustable, it being understood that either the resistor or slidewire may be moved relative to the contact, or the contact moved relative to the slidewire, or both.

The potentiometric network 19 includes a battery 30, a series resistor 31, a branch including slidewire 32, a branch including slidewire 18, and a third branch including a slidewire 33 and end coils or resistors 34 and 35. Similarly, the potentiometric network 24 includes a suitable source of direct current supply, such as battery 36, a series resistor 37, another branch including a slidewire 38, a further branch including the slidewire 25, and a third branch including a voltage divider comprising resistors 40 and 41.

It will now be assumed that there is a direct electrical connection between the center point 42 of the voltage divider between resistors 40 and 41, directly to one terminal 28b of the amplifier 27a, the connection to the other terminal, input terminal 28a thereof, being to the contact 33a of slidewire 33. It will be further assumed that a change in the ion concentration of the solution within vessel 10 has occurred, resulting in rotation of motor 12b in a direction to move contact 18a in a clockwise direction to increase the potential difference between contact 33a and conductor 44. If prior to the described movement of contact 18a the contact 25a occupied a position to apply between conductor 44 and the point 42 a voltage equal and opposite to that between contact 33a and conductor 44, there would of course be zero signal applied to the amplifier 27a. After the described movement of contact 18a, however, the potential difference between contact 33a and conductor 44 would be greater than that between point 42 and the conductor 44. Hence an input signal is applied to the amplifier which, through the control 27b, energizes the motor 27c in a direction to move contact 25a in a counterclockwise direction. The contact 25a will be moved until the voltage between contact 42 and conductor 44 is equal and opposite to the new potential difference established between contact 33a and conductor 44. During the foregoing adjustment of contact 25a, the valve 20 will be moved to a new position.

Figure 2:
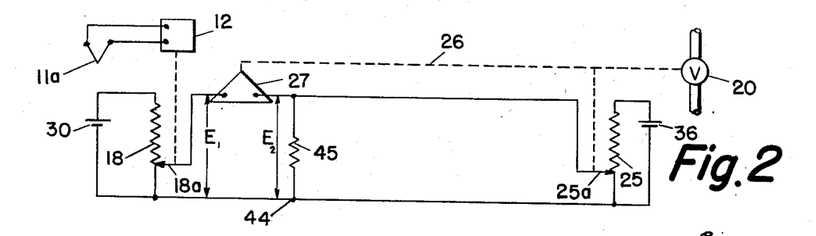
Figs. 2–6 are fragmentary wiring diagrams to be referred to in explanation of their combined functions in Fig. 1.

With the assumption made upon which the foregoing description has been based, it will be seen that the system so far described is diagrammatically illustrated in Figure 2 and this circuit will provide proportional control action. That is to say for a given adjustment of the contact 18a along the control slidewire 18 there will be a corresponding follow-up adjustment by the motor 27c of the valve 20 and also of the slidewire contact 25a. If the voltage change across contact 33a and conductor 44 for a given movement of contact 18a is the same as the voltage change between point 42 and conductor 44 by a like movement of contact 25a, it will of course be seen that a given angular movement of contact 18a will produce an equal angular movement of contact 25a and an equal change in position of valve 20.

The foregoing circuit as thus far described has been illustrated in simplified form in Fig. 2 where the electro-mechanical amplifier, forming a part of the measuring and indicating system, has been illustrated at 12, a thermocouple 11a being illustrated for convenience in the input circuit of the electro-mechanical amplifier 12, instead of the ion responsive device 11 of Figure 1. Further to clarify the pictorial understanding of the system the contact 18a is shown below the slidewire 18 and adjacent the conductor 44. Accordingly no potential difference appears between contact 18a and that conductor. Similarly, no potential difference appears between contact 25a and conductor 44. Therefore the input signal to the electromechanical amplifier 27 is zero. A movement of contact 18a upwardly along slidewire 18 does produce a potential difference and is representative of the action produced by movement of contact 18a in Fig. 1; that is to say, upon appearance of the voltage between contact 18a and conductor 44, the electromechanical amplifier produces adjustment of contact 25a and of valve 20. The adjustment is continued until there is developed across a resistor 45, a potential difference equal and opposite to that between contact 18a and conductor 44. Though the resistor 45, in Fig. 1, is shown as including a fixed resistor 45b and a slidewire 45c, in Figs. 2-6 the slidewire resistor 45c has been omitted for purposes of simplicity. If the slidewire resistors 18 and 25 be assumed to have equal resistance values and the voltages of sources 30 and 36 are also equal, then there will be strict correspondence between the movement of contact 18a and follow-up movement of contact 25a. However, if the voltage of battery 30 is twice that of battery 36, then it will require twice the movement of contact 25a to establish between it and conductor 44 a voltage equal and opposite to that produced by movement of contact 18a along slidewire 18. Mathematically, for a given change in the magnitude of the controlled variable, ion concentration in Fig. 1 and temperature in Fig. 2, the adjustment of slidewire contact 25a and of valve 20 will be equal to $K_1\theta$, where $\theta$ is the controlled variable, and $K_1$ is the proportionality constant. The manner in which the proportionality constant may be changed has been described in the previously mentioned patent and application. In Fig. 1, the voltage of the battery 30 as applied to the slidewire 18 can be varied by changing the value of resistance across slidewire 18, as by adjustment of contact 32a of slidewire 32. Similarly, the voltage applied to slidewire 25 from battery 36 can be adjusted by moving contact 38a relative to slidewire 38. Since the adjustments of the resistors to change the proportionality constant will be in opposite directions, the two contacts 32a and 38a can be mechanically interconnected for simultaneous movement, but with opposite adjustment effects upon their respective slidewires to give a throttling range or proportional band adjustment. A change in the movement of valve 20 and contact 25a for a given movement of contact 18a is generally referred to as proportional action. One of the limitations of proportional control action acting alone as a mode of control is that any sustained change of position of valve 20 requires a sustained deviation of the condition from the control point. The operation or adjustment of valve 20 must first be preceded by a movement of contact 18a along slidewire 18. If the proportional band be narrow, that is to say, that a large movement of contact 25a and valve 20 shall be required to balance the voltage produced by a small movement of contact 18a, then, of course, there will be required only a slight change in the position of contact 18a to give and sustain the required change in the position of valve 20. Such a narrow proportional band will have a tendency to produce undesirable hunting or oscillation of the controlled variable about the control point. Under some conditions, it will be seen that the normal operation might require the valve 20 to be slightly open, as for example, when there is a low rate of flow of liquid through the pipe 22 of Fig. 1 into vessel 10. On the other hand, if that flow were large, then the valve 20 might be required to be nearer its open position. For these two different conditions it will be obvious that the contact 18a would have to occupy different positions on the slidewire 18. The foregoing demonstrates one of the limitations of simple proportional action in a controlled system.

Figure 3:
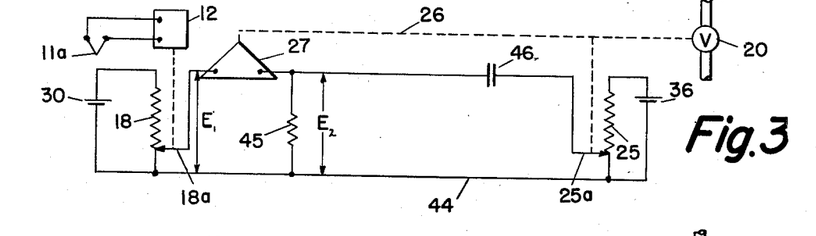

The system of Fig. 1 also includes automatic reset action provided by resistor 45 and capacitor 46, both of which are shown in the diagrammatic sketch of Fig. 3. Automatic reset action compensates for the requirement already indicated that if the valve is to be maintained nearer to the fully open position, then the contact 18a must occupy a position along slidewire 18 different than it would for a more nearly closed position of valve 20. Mathematically, the reset action may be expressed as a correction of magnitude corresponding with the integral with respect to time of the deviation of the controlled variable, $\theta$, from the control point, i. e., equal to $$K_2 \int_0^t \theta dt$$

where $K_2$ is the reset constant and $dt$ is the time differential increment. With the capacitor 46 in the circuit, the slidewire contact 25a will be moved by the electro-mechanical amplifier 27 to maintain the equality between the voltage between contact 18a and conductor 44 and the voltage appearing across resistor 45. In this connection it is to be emphasized that the electromechanical amplifier and motor 27c of Fig. 1 is of the high impedance input type, that is to say, no current flows through the input circuit of the amplifier 27a including its terminal 28a and 28b. Additionally, the motor 27c is operated at variable speed depending upon the extent of the deviation of the condition from the control point.

Since in Fig. 3 current must flow through the capacitor 46 and through resistor 45 in order to produce the voltage balancing that between contact 18a and 44, the voltage introduced by the position of contact 25a must continue to change. If voltage $E_1$ is of constant magnitude and contact 25a is moved until it applies to capacitor 46 and conductor 44 an equal and opposite voltage, it will be seen that the capacitor 46 will start to acquire a charge and this charge will develop a voltage across the capacitor 46 thus reducing the current flowing through resistor 45 destroying the balance. Accordingly, contact 25a must be moved at a speed which will insure flow of current through resistor 45 to produce the potential difference $E_2$ equal and opposite to $E_1$. The electro-mechanical amplifier 27 produces such a movement of contact 25a. In accordance with the system of Fig. 3, the contact 25a will continue to move to maintain $E_2$ equal and opposite to $E_1$ so long as there is departure in the value of the characteristic or the controlled variable from its control point. Accordingly the adjustment of valve 20 and of slidewire contact 25a will be in accordance with the sum of: the deviation of the controlled variable from the control point and the integral of this deviation with respect to time. This may be expressed as $$-V = K_1 \theta + K_2 \int_0^t \theta dt$$

where $-V$ is the total adjustment of the position of valve 20.

After an interval of time following the initial change in the controlled variable the corrective adjustment of valve 20 influences the process and returns the controlled variable to the control point, which means that contact 18a will again be in the position shown in Fig. 3. However, contact 25a will not be returned to its original position because the capacitor 46 has acquired a charge during the time interval when contact 18a was away from its original position. That charge has a plurality such that the potential difference across capacitor 46 is opposite to the potential difference between contact 25a and conductor 44. Hence zero voltage across resistor 45, $E_2$, will be obtained when contact 25a is returned to a position other than its original position so that a potential difference will be produced between 25a and 44, equal and opposite to the potential difference established by the charge acquired by capacitor 46. Thus the reset action results in a balancing of $E_2$ and $E_1$ with the contact 25a and the valve 20 in a new position, a position determined by the time integral of the current flow through the capacitor 46.

From the foregoing it will be seen the capacitor 46 must be of high quality, that is, having a leakage much less than normally encountered with highgrade oil-filter paper capacitors. Preferably it is constructed of polystyrene film, with a resistance of the order of one million megohms. If there were significant leakage of the charge on capacitor 46, the reset or droop-corrector action would be imperfect because the leakage current flowing through resistor 45 would introduce voltage therein which would prevent the complete return of the voltage to zero.

When reset action is employed it is convenient to know the magnitude of that action as compared with the proportional control action already described. This relationship is normally referred to in the control art as reset rate, or as termed herein, the reset control effect, $s$. The reset control effect is a characteristic of the controller itself and hence can be measured without connecting the controller to a process. This effect is measurable in the valve motion in response to a sudden step in the position of contact 18a. One convention of measurement of reset rate is that if, upon a given adjustment of contact 18a, which has existed for the duration of one minute in a new position, there results a movement of contact 25a through a distance twice that which would be produced by proportional action only, then there is said to be one repeat per minute. The units used to designate the reset rate or reset control effect are repeats per minute. Specifically, if one half of a volt is introduced by movement of contact 18a, which one half volt, representing E₁, continues for a duration of one minute, and there is a total movement of contact 25a to produce one volt in order that E₂ shall balance E₁ at the end of one minute, there will have occurred one repeat of the proportional action. If under the foregoing assumptions, E₁ appears as a half volt for two minutes, then the contact 25a will be moved to produce one and one half volts between it and conductor 44 in order that E₂ shall equal E₁. In such case the number of repeats per minute would be the same as before. However, if the value of resistor 45 be decreased, more current would be required to produce the same value of E₂ and the charging rate of capacitor 46 would be increased. Hence if there were a half volt representative of voltage E₁, contact 25a would be moved at a greater rate in order that E₂ balance E₁ since capacitor 46 would become charged to a higher value of voltage in a given time interval. Thus there might be two repeats for a minute, or four, depending upon the amount of decrease in the size of resistor 45 across which E₂ is developed.

In the proportional action and the reset action which has been described no account is taken as to whether or not the controlled variable changes at a slow rate or at a high rate. In many systems of control, particularly in maintaining ion concentration at a constant value, if the ion concentration should begin rapidly to depart from the predetermined value or the control point, it would be desirable that the valve 20 shall rapidly be adjusted to counteract the change. In order to provide such action, an adjustment of the valve 20 in accordance with the rate of change of the controlled variable the circuit provisions of Fig. 4 may be provided. These circuit connections have been simplified by omission of the reset capacitor 46. There have been added a series resistor 47 and a capacitor 48 in shunt across the resistor 45. As in the preceding discussions with reference to Fig. 2 and 3, upon a given change of position of contact 18a the contact 25a must be adjusted in manner such that E₂ appearing across the resistor 45 will be equal and opposite to E₁. If contact 18a is adjusted to apply an input voltage E₁ to amplifier 27, the contact 25a will immediately be moved in a direction to apply a voltage to a circuit leading to the other part of the input circuit of electro-mechanical amplifier 27. Current flowing due to the voltage between contact 25a and conductor 44 will pass by way of series resistor 47. It then divides as between the resistor 45 and the capacitor 48. If E₁ be considered as starting at zero and then increasing uniformly initially, all of the current flowing due to the appearance of a change in voltage between contact 25a and conductor 44 will flow to condenser 48 since its charge and hence its potential difference will be exceedingly low.

Figure 4:
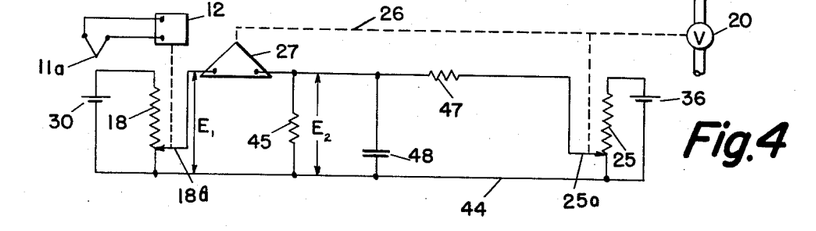

With a perfect capacitance for capacitor 48, and in the absence of resistor 47, theoretically an infinite current could flow for an infinitesimal time as a result of a small change of voltage occasioned by movement of contact 25a. The effect, however, of capacitor 48 and the resistor 47 is a finite movement of contact 25a in order to force a finite current through resistor 47. This gives a finite current through capacitor 48 and an increasing current through resistor 45 to produce a voltage, E₂ to balance the uniformly increasing voltage E₁. The initial step movement of contact 25a will have a size dependent upon the magnitude of resistor 47 and the rate of change of E₁. The larger the value of resistor 47, the larger will be the step taken by contact 25a. As voltage E₂ appears across the resistor 45 equal and opposite to E₁, it will change at the same rate as the gradually increasing voltage change of E₁ already assumed to be occurring. Mathematically, the rate action may be expressed by saying that there will be provided a component in the position of the final control element equal to $$K_3 \frac{d\theta}{dt}$$

where K₃ is the rate action constant, and $$\frac{d\theta}{dt}$$

is the rate of change of controlled variable, θ, with respect to time, t. The voltage between contact 25a and conductor 44 will be attenuated by the charging current of capacitor 48 flowing through resistance 47. The greater the value of the resistance 47, the greater will be the attenuation, and thus the greater must be the adjustment of contact 25a to make the voltage E₂ equal and opposite to the voltage E₁. The greater the rate of change of the controlled variable, as reflected by the greater rate of change of contact 18a, the greater must be the initial step and the rate of change of contact 25a. In other words, the rate action introduces a further component of control which causes contact 25a and the valve 20 to be moved an additional amount dependent upon the rate of change of the controlled variable.

Rate control effect or rate time, r, may be expressed as:

$$r = \frac{\text{rate action constant}}{\text{proportional action constant}} = \frac{K_3}{K_1}$$

The rate action, if excessive, may introduce oscillation into the operation of the system as a whole. As the controlled variable is returned to the control point, the rate action may produce movement of slidewire contact 25a beyond that necessary to maintain the characteristic at the control point. Even with rate action adjusted to avoid oscillation, small rapid, random changes in the controlled variable may produce large rapid changes in the positions of valve 20 and contact 25a because of the presence of rate action. This may not only be undesirable from the process standpoint, but also will impose undue wear upon the final control element, the valve 20. This undesirable valve action may be minimized without reduction of the rate action by introducing rate delay action. By including resistance in series with capacitor 48 such as the resistor 49 shown in Figs. 1 and 5 this rate delay control action is realized. In other words, with the initial rush of current through the path including capacitor 48, due to movement of contact 25a, the potential drop across resistor 49 will be immediately reflected by a finite voltage E₂ which will be equal and opposite to E₁. Thus, upon change in position of contact 18a, the full rate action is not immediately effective to change the position of contact 25a, but upon continued change of contact 18a the full rate action is effective. The initial effect of the rate action is dependent upon the adjustment of the circuit parameters, including resistors 47, 49, and the size of capacitor 48.

Figure 5:
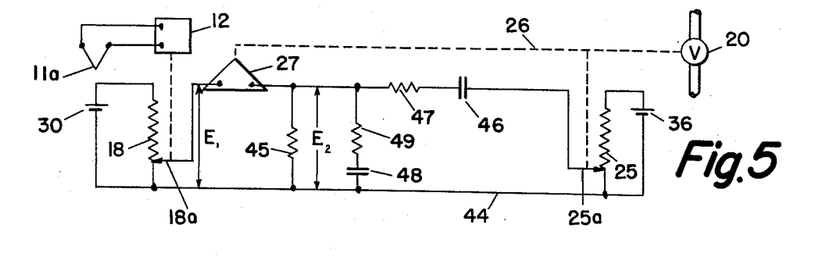
Figure 6:
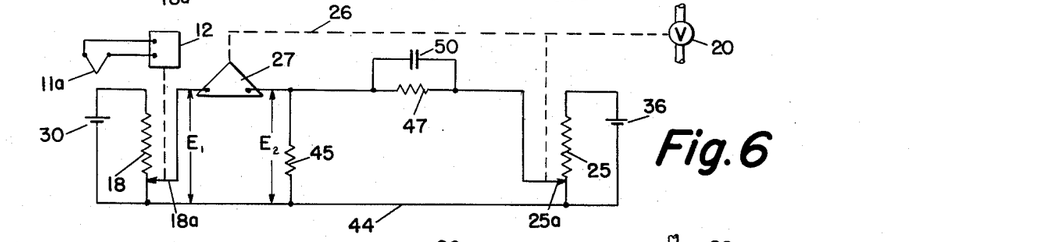

Fig. 6 is like Fig. 5 with the exception that a capacitor 50 has been provided in parallel with resistor 47 and the reset and rate capacitances 46 and 48 have been omitted.

The capacitor 50 is preferably of relatively small size, for example, one-tenth of a microfarad. The effect of this capacitor is to produce motor stabilization, that is to say, control of the electro-mechanical amplifier so that the contact 25a is moved to a new position without overshooting the balance point. Considering only the circuit elements as shown in Fig. 6, if the contact 25a be assumed to be moving at a constant rate, it will be apparent that current will flow through the capacitor 50 and through the resistor 45 to develop a voltage or potential difference $E_2$ whose magnitude will depend upon the rate of change of voltage due to the speed of adjustment of contact 25a. Thus, the contact 25a, the capacitor 50, and the resistor 45 is a voltage divider circuit in which the voltage $E_2$ will have a magnitude determined in part by the speed of movement of contact 25a. As balance is approached, this additional component in the voltage $E_2$ produces a balance between $E_2$ and $E_1$ at a time earlier than would occur due solely to the position of contact 25a. By thus producing balance between potential differences $E_2$ and $E_1$, at a point prior to the arrival to the contact 25a at its final position, the motor or electro-mechanical amplifier 27 will be deenergized and the contact 25a will come to rest in its final position without overshooting. In this manner there is provided motor stabilization and there is avoided tendency in the system for oscillation and instability to be present and to occur. This motor stabilization may be added to the other control actions in either of two ways. As shown in Fig. 1, capacitor 50 may be connected in shunt across resistor 47. The other way is to insert the section including resistors 45 and 47 and capacitor 50 of Fig. 6 between amplifier 27 and resistor 45 in Fig. 5. Since the temporary effect of motor stabilization opposes rate action, this action has been called negative rate action.

Figure 7:
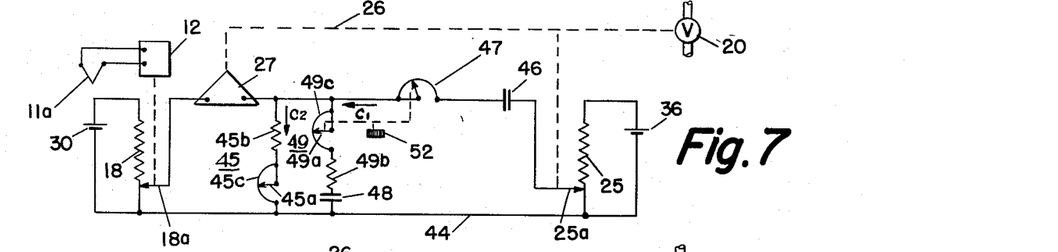
Fig. 7 is a fragmentary wiring diagram similar to Fig. 1.

Fig. 7 is similar to Fig. 5, but it will be observed that the resistor 45 is shown as comprising adjustable resistor 45c and a section 45b of fixed value which is not adjustable. The resistors or slidewires 47 and 49c are adjustable and can be simultaneously adjusted to change the resistance thereof in their respective circuits and in the same direction. A knob is illustrated as driving the two contacts 49a and 47a. In accordance with the invention, it is important to make several observations with respect to the arrangement of these circuit elements. It will be recalled that the reset action is dependent upon the size of capacitor 46, and the value of the resistance 45, while the rate action is dependent upon the size of capacitor 48 and the value of resistance 47. However, in the arrangement shown in Fig. 7, the resistance 45 not only controls in part the reset action, but also serves as a voltage-developing resistor across which the entire voltage $E_2$ is produced for balancing the potential difference, $E_1$, which varies in accordance with changes in the controlled variable. As thus connected, the input circuit for amplifier 27a includes in series the first source of voltage, slidewire 18, and the balance voltage-developing resistance 45 in a direct-current conductive path. As thus considered, the remainder of the control network including valve slidewire 25, reset reactance 46, rate resistor 47 and rate reactance 48 is connected across the terminals of the resistance termination, resistor 45.

Otherwise considered, the resistor 45 is connected in parallel with a branch including the rate capacitor 48. This arrangement may be designated a two-terminal section. The network extending between this two-terminal section and the valve slidewire 25 has connected in series rate resistor 47 and reset capacitor 46 and this likewise may be designated as another two-terminal section. When so considered, the control circuit does not have any three terminal sections. Rather, it may be considered to comprise at least a pair of two-terminal sections connected in series with each other and with the valve slidewire 25. The transmitting slidewire 18 and the amplifier input are connected in series with the first of these two-terminal sections which includes the required direct-current conductive branch between its terminals.

It will be further noted that the arrangement in Figs. 1 and 7 do not have a multiplicity of sections or branches having impedance connections between each of the branches. By arranging the circuit elements as shown in Figs. 1 and 7, there is minimized cross-dependence resulting from adjustment of either the rate control element or the reset control element, or both. Thus, if the reset control effect is to be made greater as by decreasing the value of resistance 45, there will be a minimum change in the rate control effect. Conversely, if the rate control effect is to be increased, as by increase in the value of resistor 47 and a simultaneous increase in the value of resistor 49, there will be a minimum change in the reset control effect.

Figure 8:
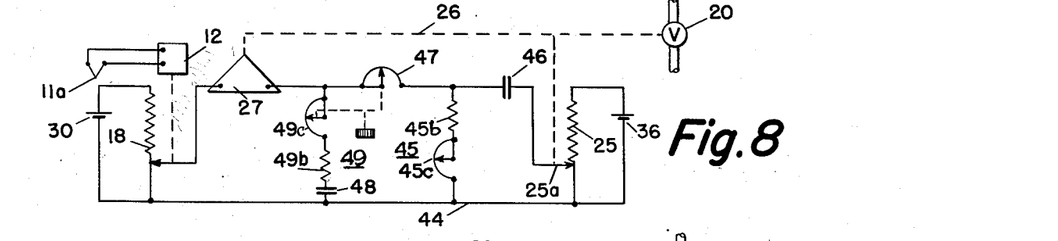
Fig. 8 is a fragmentary wiring diagram illustrating the system of said copending application of Elwood T. Davis.

The circuit arrangement of Figs. 1 and 7 is to be contrasted with the system of Fig. 8 described in copending application Serial No. 149,775, filed March 15, 1950, Elwood T. Davis, a co-employee of ours. Though the system of Fig. 8 represents improvements over the prior art, nevertheless something was left to be desired in decreasing the cross-dependence or the change in one control effect as a result of adjustment of another of the control effects. In the system of Fig. 8, it will be observed that the rate determining resistor 47 is in series between the branch including the resistor 45, and the branch including the rate capacitor 48. Moreover, in the system of Fig. 8, the network does not terminate at the amplifier in a resistance, but rather does terminate in a branch including the capacitor 48. Accordingly, the entire output voltage of the control network circuit cannot be produced by resistor 45. When the circuit of Fig. 8 is considered in sections, there are lacking two two-terminal sections connected in series. If divided into two sections, the arrangement of Fig. 8 necessarily includes at least one three-terminal section, whether this is taken as resistors $R_{47}$ and $R_{45}$ and capacitor $C_{46}$, or resistors $R_{45}$, $R_{47}$ and $R_{49}$ and capacitor $C_{48}$. Considered in either way, there is no resistive termination for this circuit arrangement across which the entire balancing voltage $E_2$ can be developed.

There are certain practical limitations upon the values which may be used for the various components of the system. Inasmuch as the capacitor 46 must be of the highest possible grade, cost dictates that it must be relatively small. In practice, the reset capacitor 46 has been selected so as to have a capacity of ten microfarads while the rate capacitor 48 has a capacity of 25 microfarads. The rate adjusting resistor 47 has a maximum value of 50 megohms. Reset adjusting resistors 45c and 45b have a total maximum value of 100 megohms, while the resistors in series with the rate capacitor 48 respectively have maximum values of 100,000 ohms for slidewire 49c and 15,000 ohms for fixed resistor 49b.

For purposes of comparison, the circuit components of Fig. 8 may be assumed to have the same values as those stated for the circuit components of Fig. 7. Reference has already been made to repeats per minute as a measure of reset rate $s$. Reference has also been made to rate time, $r$. If the product of repeats per minute, $s$, and rate time, $r$, be determined with the adjustable resistors set for a number of different values, the product of $r$ times $s$ may be taken as a figure of merit. The greater the maximum obtainable product, the less will be the cross-dependence of the control effect. From certain theoretical considerations, it appears probable for controllers employing only a single amplifier and an electrical network including only resistors and capacitors, as in Figs. 7 and 8, that 0.25 is a maximum value of the $r-s$ product. For immediate comparative purposes, the maximum $r-s$ products for Fig. 8 attainable comes to 0.0735, while the maximum $r-s$ product for the system of Fig. 7 is more than twice that value, namely: 0.177. For the control system of Fig. 8, the maximum $r-s$ product can be expressed mathematically as follows:

(1) $$rs_{max} = \frac{\left(1 - \frac{T_2}{T_1}\right)^2}{4\left(1 + \frac{C_{48}}{C_{46}} + \frac{T_2}{T_1}\right)}$$

The above maximum product for $r-s$ is obtained when (2) $$\frac{R_{47}}{R_{45}} = \frac{T_1 + T_2}{T_1 - T_2} + \frac{C_{46}}{C_{48}}$$

where $$T_2 = R_{49}C_{48}$$
$$T_1 = R_{45}C_{46}$$

When $T_2$ equals zero, that is, when the rate delay is zero, Equation 1 reduces to (3) $$rs_{max} = \frac{1}{4\left(1 + \frac{C_{48}}{C_{46}}\right)}$$

For the system of the present application, particularly Figs. 1 and 7, the maximum product for $r-s$ may be mathematically stated as follows:

(4) $$rs_{max} = \frac{1}{4\left(1 + \frac{C_{46}}{C_{48}} + X^2\right)}$$

where (5) $$X = \frac{R_{49}}{R_{45}}.$$

The maximum for $rs$ occurs at (6) $$\frac{R_{47}}{R_{45}} = 1 + \frac{C_{48}}{C_{46}}(1 + 2X^2)$$

With zero rate delay, Equation 4 reduces to (7) $$rs_{max} = \frac{1}{4\left(1 + \frac{C_{46}}{C_{48}}\right)}$$

It is to be observed that the ratio of capacitors $C_{46}$ and $C_{48}$ appears reversed in Equation 7 for Fig. 7 as against that ratio of capacitors in Equation 3 for the system of Fig. 8. This inversion of the ratio of the capacitors coupled with the practical considerations of the sizes of these capacitors as discussed hereinbefore accounts for the great increase in the figure of merit or the great decrease in cross-dependence of the control effects in the system of Fig. 7.

If it be assumed that the electro-mechanical amplifier means 27 has unlimited gain and is able to vary the position of contact 25a on slidewire 25 instantaneously in response to movements of contact 18a on slidewire 18, the current flow, i. e., in the input circuit for amplifier 27a may be assumed to be always zero. Further, assuming that prior to time $t=0$, all currents and voltages in the network branches are zero, a voltage $\theta(t)$ is impressed on the network by movement of contact 18a on slidewire 18, starting from zero and rising at a constant rate. Under these conditions, Kirchhoff's law for voltages around the branches of the circuit shown in Fig. 7 may $i_2$=current flow as indicated.

(8) $$V(t) = \int_0^t \frac{i_1 dt}{C_{46}} + R_{47}i_1 + R_{49}(i_1 - i_2) + \int_0^t \frac{(i_1 - i_2)dt}{C_{48}}$$

(9) $$0 = R_{45}i_2 + \int_0^t \frac{(i_2 - i_1)dt}{C_{48}} + R_{49}(i_2 - i_1)$$

(10) $$\theta(t) = R_{45}i_2$$

where $V(t)$ =voltage between contact 18a and line 44
$i_1$=current flow as indicated
$i_2$=current flow as indicated.

Subtracting Equation 9 from Equation 10, we obtain (11) $$\theta(t) = R_{49}(i_1 - i_2) + \int_0^t \frac{(i_1 - i_2)dt}{C_{48}}$$

by subtracting Equation 11 from Equation 8

(12) $$V(t) - \theta(t) = \int_0^t \frac{i_1 dt}{C_{46}} + R_{47}i_1$$

Taking the Laplace Transformation of Equations 10, 11 and 12 respectively, we obtain:

(13) $$\theta(s) = R_{45}I_2(s)$$

(14) $$\theta(s) = I_1(s)\left(R_{49} + \frac{1}{C_{48}s}\right) - I_2(s)\left(R_{49} + \frac{1}{C_{48}s}\right)$$

(15) $$V(s) - \theta(s) = I_1(s)\left(R_{47} + \frac{1}{C_{46}s}\right)$$

Solving for $I_2(s)$ in Equation 14.

(16) $$I_2(s) = \frac{I_1(s)\left(R_{49} + \frac{1}{C_{48}s}\right) - \theta(s)}{R_{49} + \frac{1}{C_{48}s}}$$

From Equation 13

(17) $$I_2(s) = \frac{\theta(s)}{R_{45}}$$

Substituting for $I_2(s)$ in Equation 15:

(18) $$\frac{\theta(s)}{R_{45}} = \frac{I_1(s)\left(R_{49} + \frac{1}{C_{48}s}\right) - \theta(s)}{R_{49} + \frac{1}{C_{48}s}}$$

From Equation 15

(19) $$I_1(s) = \frac{V(s) - \theta(s)}{R_{47} + \frac{1}{C_{46}s}}$$

Substituting for $I_1(s)$ in Equation 18:

(20) $$\frac{\theta(s)}{R_{45}} = \frac{V(s) - \theta(s)}{R_{47} + \frac{1}{C_{46}s}} - \frac{\theta(s)}{R_{49} + \frac{1}{C_{48}s}}$$

(21) $$V(s) - \theta(s) = \theta(s)\left[\frac{1}{R_{45}} + \frac{1}{R_{49} + \frac{1}{C_{48}s}}\right]\left(R_{47} + \frac{1}{C_{46}s}\right)$$

(22) $$V(s) = \theta(s)\left[1 + \frac{R_{47} + \frac{1}{C_{46}s}}{R_{45}} + \frac{R_{47} + \frac{1}{C_{46}s}}{R_{49} + \frac{1}{C_{48}s}}\right]$$

(23) $$V(s) = \theta(s)\left[1 + \frac{R_{47}}{R_{45}} + \frac{1}{R_{45}C_{46}s} + \frac{R_{47} + \frac{1}{C_{46}s}}{R_{49} + \frac{1}{C_{48}s}}\right]$$

Assuming that rate delay is zero, that is, assuming $R_{49}=0$, Equation 23 may be simplified to the form:

(24) $$V(s) = \theta(s)\left[1 + \frac{R_{47}}{R_{45}} + \frac{1}{R_{45}C_{46}s} + \frac{R_{47} + \frac{1}{C_{46}s}}{\frac{1}{C_{48}s}}\right]$$

Rearranging the terms, Equation 24 becomes:

(25) $$V(s) = \theta(s)\left[1 + \frac{R_{47}}{R_{45}} + \frac{C_{48}}{C_{46}}\right] + \frac{\theta(s)}{R_{45}C_{46}s} + \theta(s)(R_{47}C_{48}s)$$

By inverse Laplace transformations, one obtains the integro-differential equation for the controller of Fig. 7

(26) $$V(t) = \theta(t)\left[1 + \frac{R_{47}}{R_{45}} + \frac{C_{48}}{C_{46}}\right] + \frac{1}{R_{45}C_{46}}\int_0^t \theta dt + R_{47}C_{48}\frac{d\theta}{dt}$$

From Equation 26 it is apparent that the term:

$$1 + \frac{R_{47}}{R_{45}} + \frac{C_{48}}{C_{46}}$$

represents the proportional action constant, $K_1$, of the total voltage $V(t)$ developed between contact 25a and line 44 in Fig. 7, while $$\frac{1}{R_{45}C_{46}}$$

represents the reset action constant, $K_2$, and $$R_{47}C_{48}$$

represents the rate action constant, $K_3$, where $K_1$, $K_2$ and $K_3$ are as identified hereinbefore.

It will be apparent that the entire equation may be modified by a further constant affecting each of the three constants in like proportion. For example, if an adjustment be made in the proportional band by adjustment of slidewires 32 and 38, then each of the three constants $K_1$, $K_2$ and $K_3$ would be multiplied by another constant without affecting the basic relationship as set forth above. However, for the sake of simplicity, the magnitude of this constant has been assumed to be unity. It will also be apparent that the magnitude of the voltage $E_1$, variable in response to deviations in the controlled characteristic, has been assumed to be unity.

The proportional action constant, $K_1$, may be expressed as:

$$1 + \frac{C_{48}}{C_{46}} + Z\frac{C_{46}}{C_{48}}$$

where $$Z = \frac{R_{47}C_{48}}{R_{45}C_{46}}$$

By similar analysis, the proportional action constant of the arrangement shown in Fig. 8 is:

$$1 + \frac{C_{48}}{C_{46}} + Z$$

Since the ratio of the size of the reset capacitor to the size of the rate capacitor, $C_{46}/C_{48}$, can practicably be made much less than unity, it is possible to obtain a minimum of dependence of the proportional action upon adjustments of the rate control element and the reset control element with the arrangement shown in Fig. 7. In particular, the variable portion of the proportional action constant, which involves the variable Z, may be reduced in size with the arrangement shown in Fig. 7 as compared to its size in the arrangement shown in Fig. 8.

Figures 9, 10:
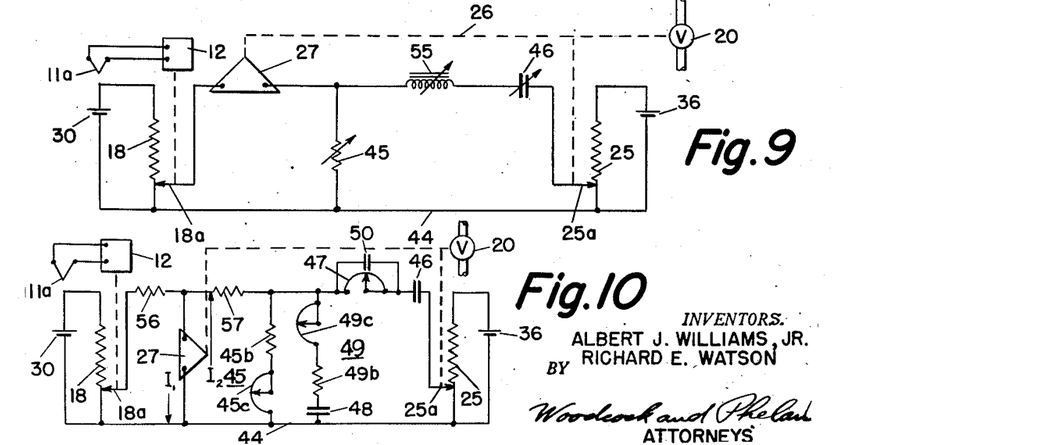
Fig. 9 is a fragmentary diagram of a further modification of the present invention.
Fig. 10 is a fragmentary diagram of a modification of Fig. 7 to detect an unbalance of two current flows.

The circuit arrangement of Fig. 9 illustrates another embodiment of a control circuit having reduced cross-dependence of control effects in accordance with the present invention. In the circuit there illustrated, an inductance such as choke coil 55 is connected in series circuit between capacitance 46 and a terminal of resistor 45 so that both capacitor 46 and coil 55 serve as adjustable reactance elements in the shunt circuit including valve slidewire 25 connected across the terminals of voltage developing resistor 45. The independence of adjustments of the control actions by this arrangement is illustrated by the following mathematical analysis.

With reference to the arrangement shown in Fig. 9, the following equations may be written in accordance with Kirchhoff's Law, making the same assumptions that were made in the analysis of Fig. 7:

(27) $$\theta = iR$$

(28) $$V(t) = L\frac{di}{dt} + Ri + \frac{1}{C}\int_0^t i\, dt$$

Substituting for $i$ in Equation 28:

(29) $$V(t) = \frac{L}{R}\frac{d\theta}{dt} + \theta + \frac{1}{RC}\int_0^t \theta\, dt$$

from which $$1 = \text{proportional action constant}$$

$$\frac{L}{R} = \text{rate action constant}$$

$$\frac{1}{RC} = \text{reset action constant}$$

It will thus be seen that reset and rate action adjustments may be made in the arrangement of Fig. 9 without effect upon the proportional action and there will be no cross-dependence of either rate time or reset rate when adjustment is made of the other control action, when adjustment of rate action is made by varying the reactance of capacitor 46 while rate action is varied by adjustment of coil 55 alone with the value of resistor 45 held fixed.

The arrangement of Fig. 9 is most useful in control systems having short lag times between measurement of the variable characteristic and adjustment of the control means to return the variable characteristic to its control point. An example of such a system is in the measurement of pH as diagrammatically illustrated in Fig. 1, but the system is not necessarily so limited since the time constants of this circuit are dependent upon the L to R ratio and the RC product and the choice of this system for control will depend upon the necessity for greater independence of adjustment of control effects and the relative costs of the reactance elements.

There is illustrated in Fig. 10 a further modification of the invention for controlling the operation of amplifier 27 in accordance with the unbalance between two electrical quantities. However, as distinguished from the arrangement of Fig. 7, the amplifier is responsive to the unbalance in flow of two direct currents. The first of these electrical currents, $I_1$, varies in accordance with deviations of the controlled characteristic from the control point and flows from slidewire 18 through resistor 56 to one side of the amplifier input. The second current flow, $I_2$, which is proportional to the voltage across resistor 45, is applied to the same terminal of amplifier 27 through resistor 57. The purpose of resistors 56 and 57 is to isolate the current sources so that the input current from slidewire 18 and that produced by the voltage across resistor 45 may be properly proportioned to be of substantially the same magnitude. It will be observed that amplifier 27 in Fig. 10 is connected so that the flow paths of the two currents are connected to one amplifier terminal while the opposite terminal of the amplifier is connected directly to common conductor 44. From the foregoing description it will be apparent that with the arrangement of Fig. 10, amplifier 27 is so connected that it detects the unbalance between two current flows as distinguished from detecting the unbalance of two potential differences, to control the operation of the final control element, valve 20 and contact 25a on slidewire 25. As thus connected, amplifier 27 controls the position of contact 25a so that the current flow $I_2$ will balance current flow $I_1$.

While the source of current $I_1$ is shown to be slidewire 18, this source of current could be provided by a cell of the photo-voltaic type. Such a device may be used to measure the controlled characteristic, such as temperature, directly without the necessity of using thermocouple 11a and amplifier 12.

While various modifications and changes will occur to those skilled in the art, it will be understood that such changes from the circuits specifically disclosed and discussed may be within the scope of the appended claims.

What is claimed is:

1. A control system having an amplifier responsive to changes in an electrical quantity applied to its input circuit for controlling the adjustment of a compensating means upon deviation of a condition under control comprising a source of voltage adjustable with adjustment of said compensating means, said adjustable source of voltage having in series therewith a network including a reset capacitor, a rate resistor, and a resistance termination for said network including a reset resistor, said reset resistor being shunted by a branch including a rate capacitor, and connections for applying at least a portion of the potential drop across said resistance termination to said input circuit in opposition to an electrical quantity applied thereto in response to a deviation in said condition.

2. A control system having an amplifier to the input of which there is applied an electrical signal characterized by the provision of a reset resistor in said input circuit for developing another electrical signal opposing the first-named signal, a rate capacitor connected in shunt with said reset resistor, a source of voltage adjustable in accordance with changes in the output of said amplifier, and a circuit between said reset resistor and said source of voltage including a path having therein a rate resistor and a reset capacitor.

3. A control system having an amplifier to the imput of which there is applied an electrical signal characterized by the provision of a reset resistor in said input circuit for developing another electrical signal opposing the first-named signal, a rate capacitor connected in shunt with said reset resistor, a source of voltage adjustable in accordance with change in the output of said amplifier, and a circuit between said reset resistor and said source of voltage including a path having therein a rate resistor and a reset capacitor, whereby there are provided proportional, reset and rate actions with minimized cross-dependence between the reset and rate control effects as a result of the proportional action constant which includes the sum of two components, one of which includes the ratio of the size of the rate capacitor to that of the reset capacitor, and the other includes the ratio of the size of the rate resistor to that of the reset resistor.

4. A control system having an amplifier to the input of which there is applied an electrical signal characterized by the provision of a reset resistor in said input circuit for developing another electrical signal opposing the first-named signal, a rate capacitor connected in shunt with said reset resistor, a source of voltage adjustable in accordance with changes in the output of said amplifier, and a circuit between said reset resistor and said source of voltage including a path having therein a rate resistor and a reset capacitor, whereby there are provided proportional, reset and rate actions with minimized cross-dependence between the reset and rate control effects as a result of the proportional action constant which includes the sum of two components, one of which includes the ratio of the size of the rate capacitor to that of the reset capacitor, and the other includes the ratio of the size of the rate resistor to that of the reset resistor, the rate capacitor being materially larger than the reset capacitor to provide less cross-dependence of said control effects with adjustments of the values of said rate resistor and said reset resistor.

5. A system for controlling the magnitude of a variable characteristic comprising compensating means for adjusting the value of the characteristic, means for controlling the operation of said compensating means to operate the same in a direction to maintain the value of said characteristic at a predetermined value comprising an amplifier responsive to the difference between a voltage variable with change in the value of the characteristic and a second voltage, resistor means including a reset resistor across which is developed said second voltage, a rate capacitor connected in a branch in shunt with said reset resistor, a voltage source variable with adjustment of said compensating means, a single two-terminal circuit section between said last-named voltage source and said reset resistor including a reset capacitor and a rate resistor, said reset resistor and said rate resistor being adjustable, the change in the proportional action constant in the system due to such adjustments being determined by the expression $$1+\frac{C_2}{C_1}+\frac{C_1}{C_2}\left[\frac{R_3C_2}{R_1C_1}\right]$$

where
$C_1$ is the capacity of the reset capacitor,
$C_2$ is the capacitance of the rate capacitor,
$R_1$ is the resistance of the reset resistor, and
$R_3$ is the resistance of the rate resistor.

6. A system for automatically adjusting a compensating means in a direction to return the magnitude of a variable characteristic toward the control point upon deviation therefrom, comprising an amplifier responsive to the difference between two potential differences, means for varying a first of said potential differences in accordance with deviation of said characteristic from the control point, a resistor for developing said second potential difference, a source of voltage variable upon change in adjustment of said compensating means, and circuit connections between said resistor and said source of variable voltage including a reset capacitor, a reset resistor, a rate capacitor and a rate resistor respectively connected to introduce rate action and reset action into the operation of said compensating means.

7. A system for automatically adjusting a compensating means in a direction to return the magnitude of a variable characteristic toward the control point upon deviation therefrom, comprising an amplifier responsive to the difference between two potential differences, means for varying a first of said potential differences in accordance with deviation of said characteristic from the control point, a resistor for developing said second potential difference, a source of voltage variable upon change in adjustment of said compensating means, and circuit connections between said resistor and said source of variable voltage including a reset reactive means, a reset resistor, a rate reactive means and a rate resistor respectively connected to introduce rate action and reset action into the operation of said compensating means.

8. A system for controlling the value of a variable chracteristic comprising an amplifier having a direct-current input circuit for response to the difference in amplitude of two opposed direct-current electrical quantities, one of which varies in accordance with changes in magnitude of said characteristic, and means for producing the other of said quantities comprising a resistor in said input circuit and a network connected to said resistor including a variable voltage source and reactance elements producing reset action and rate action connected intermediate said source and said resistor.

9. A system in accordance with claim 8 in which said reactance elements include a reset capacitance and a rate inductance connected in a series circuit with said variable voltage source and said quantity-producing resistor.

10. A system in accordance with claim 8 in which said reactance elements are capacitors, the reset action producing capacitor being connected in series between said variable voltage source and one terminal of said voltage-developing resistor and the rate action capacitor being connected in a branch directly in shunt across said quantity-producing resistor.

11. A system in accordance with claim 8 in which said quantity-producing resistor is a part of a voltage-dividing circuit and said network includes a reset resistor connected in a direct-current conductive path with said quantity-producing resistor and said reset reactance is a capacitor connected in series between said variable voltage source and said reset resistor.

12. A system in accordance with claim 11 in which the other part of said voltage-dividing circuit includes a resistor having in shunt therewith a capacitor to provide negative rate action.

13. A system for automatically adjusting a compensating means in a direction to return a variable characteristic toward a control point upon deviation therefrom comprising an amplifier responsive to differences between two voltages, a direct-current conductive input circuit for said amplifier including in series means for developing a first voltage in accordance with deviations of said characteristic from the control point and a voltage-developing resistor across which a second voltage is produced, said resistor having a shunt network connected across its terminals comprising a further voltage source variable in response to adjustment of said compensating means, a reset capacitor in series circuit between said further voltage source and one side of said resistor, and a rate circuit including a resistor connected in series with said reset capacitor and a capacitor connected in a branch directly in shunt across said voltage-developing resistor.

14. A system in accordance with claim 13 with the addition of a rate delay resistor connected in series circuit with said rate capacitor in said branch.

15. A system for controlling the value of a variable characteristic comprising compensating means for adjusting the value of the characteristic, means for controlling the operation of said compensating means to maintain said characteristic at a predetermined value comprising an amplifier responsive to differences between a voltage variable with changes in the value of said characteristic and a second voltage, said amplifier having a direct-current conductive circuit connected to the input terminals of said amplifier including in series the source of said variable voltage and a voltage-developing resistor across which said second voltage is produced, and a network circuit connected across the terminals of said resistor for supplying thereto a current to produce said second voltage comprising another voltage source and reactance circuit elements for producing reset action and rate action, said reactance elements being connected intermediate said other voltage source and said voltage-developing resistor.

16. A system for controlling the value of a variable characteristic comprising compensating means for adjusting the value of the characteristic, means for controlling the operation of said compensating means to maintain said characteristic at a predetermined value comprising an amplifier responsive to differences between an electrical quantity variable with changes in the value of said characteristic and a second electrical quantity, said amplifier having a direct-current conductive circuit connected to the input terminals of said amplifier including the source of said variable electrical quantity and a voltage-developing resistor across which said second electrical quantity is produced, and a network circuit connected across the terminals of said resistor for supplying thereto a current to produce said second electrical quantity comprising a voltage source and reactance circuit elements for producing reset action and rate action, said reactance elements being connected intermediate said voltage source and said voltage-developing resistor.

17. A control system having an amplifier responsive to changes in current flowing into its input for controlling the adjustment of a compensating means upon deviation of a condition under control from a predetermined value comprising means for applying to the input of said amplifier a current flow variable in response to deviations of said condition from said value, a source of voltage adjustable with said compensating means, said adjustable source of voltage having in series therewith a reset capacitor, a rate resistor, and a reset conductance comprising a fixed and an adjustable conductance, said reset conductance being shunted by a branch including a rate capacitor, said adjustable source of voltage comprising means for supplying a current flow through said reset conductance for producing at the input of said amplifier a current flow in opposition to the flow therethrough of said current variable in response to deviations of said condition from said value.

ALBERT J. WILLIAMS, Jr.
RICHARD E. WATSON.

References Cited in the file of this patent
UNITED STATES PATENTS

| Number | Name | Date |
| --- | --- | --- |
| 2,175,985 | Callender et al. | Oct. 10, 1939 |
| 2,282,726 | Jones | May 12, 1942 |
| 2,482,064 | Hornfeck | Sept. 13, 1949 |